Aug. 25, 1936.   R. L. LOGGINS   2,052,479
SAFETY CASE FOR GRAIN TESTING THERMOMETERS
Filed Feb. 11, 1935

Reuben L. Loggins INVENTOR
BY Victor J. Evans & Co.
ATTORNEY

Patented Aug. 25, 1936

2,052,479

UNITED STATES PATENT OFFICE 2,052,479

SAFETY CASE FOR GRAIN TESTING THERMOMETERS

Reuben L. Loggins, Blytheville, Ark.

Application February 11, 1935, Serial No. 6,114

1 Claim. (Cl. 73—52)

This invention relates to thermometer cases and has for the primary object the provision of a device of this character which is especially adaptable for thermometers employed for determining the heat of stored grain and the like and which will afford maximum protection to the thermometer against breakage either when making a test of the grain or when being carried from one place to another and also will facilitate the passing of the thermometer into grain in storage and which is readily adjustable to permit easy and quick reading of the thermometer.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a plan view illustrating a thermometer protected by a case constructed in accordance with my invention.

Figure 1:
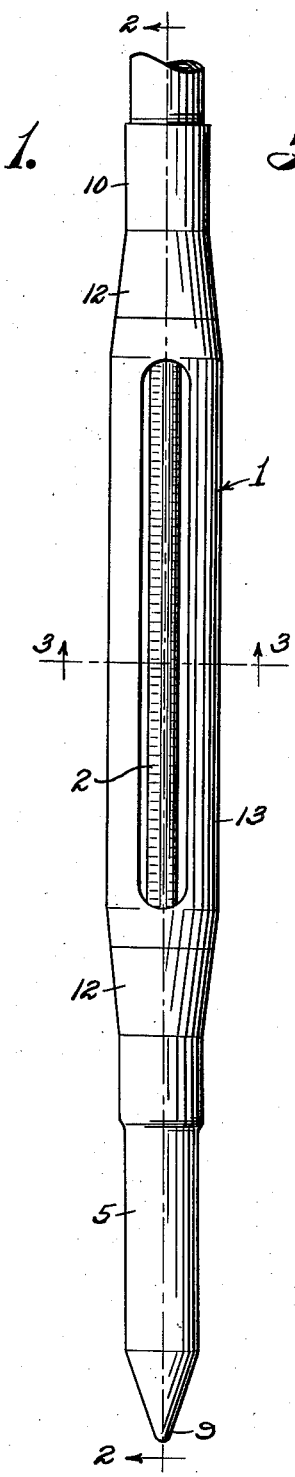
Figure 2:
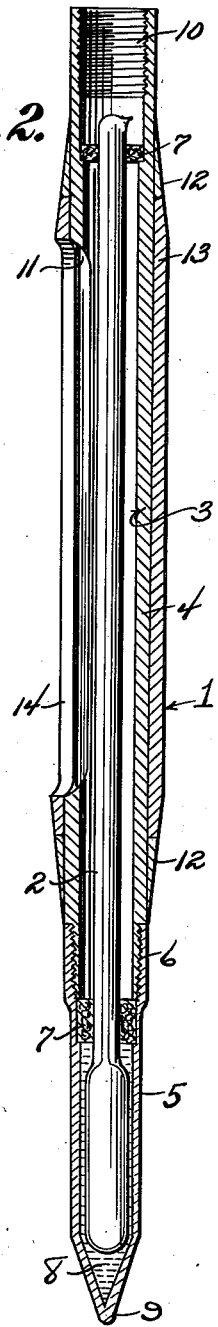
Figure 2 is a sectional view taken on the line 2—2 of Figure 1.
Figure 3:
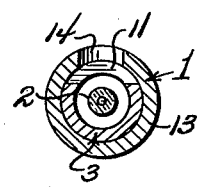
Figure 3 is a sectional view taken on the line 3—3 of Figure 1.
Figure 4:
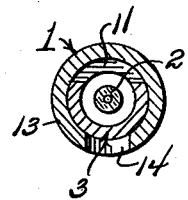
Figure 4 is a similar view showing the case closed forming a full protection for the thermometer.

Referring in detail to the drawing, the numeral 1 indicates a case especially adapted for affording complete protection to a thermometer 2 and providing a device especially adaptable for obtaining the temperature of stored grain.

The case 1 includes an inner shell 3 preferably of tubular formation and including sections 4 and 5 detachably connected by screw threads, as shown at 6. Mounted within the sections 4 and 5 are packing washers 7 forming supports for the thermometer 2 and which will retain the thermometer in spaced relation to the inner shell.

One of the packing discs closes the section 5 to the section 4. The section 5 accommodates the bulb of the thermometer and also has therein a suitable heat conducting fluid 8 which will readily transmit the temperature of the section 5 to the bulb of the thermometer for affecting the mercury of the thermometer. The section 5 at its free end is in the form of a point 9 to facilitate the insertion of the case into stored grain.

One end of the shell 3 is internally screw threaded, as shown at 10, so that a suitable handle of a desired length may be threaded to the case. The section 4 of the shell 3 is provided with a sight slot 11 exposing a portion of the thermometer so that a reading may be readily made. Adjacent the ends of the section 4 of the shell 3 are tapered bearing elements 12 forming journals for the ends of a sleeve 13 to engage. The bearing being tapered will not retard the movement of the case into and out of a pile of grain. The sleeve 13 is rotatable upon the shell and has a sight slot 14 which may be moved into and out of register with the sight slot 11 and when out of register therewith cooperates with the shell 3 in forming a complete closure or protector for the thermometer.

Having described the invention, I claim:

A protector for thermometers comprising a case having one end tapered and provided with a sight opening, means for connecting a handle to the case, means for supporting a thermometer in said case to be readable through the sight opening, tapered bearings upon said case and the tapers thereof extending in the direction of the ends of the case to facilitate the movement of the case into and out of a pile of grain, a sleeve engaging said bearing and surrounding the case and having a sight opening to be moved into and out of registration with the sight opening of the case.

REUBEN L. LOGGINS.